April 20, 1954
A. G. T. BECKING
2,676,283
OSCILLOGRAPHIC DEVICE
Filed Aug. 7, 1951
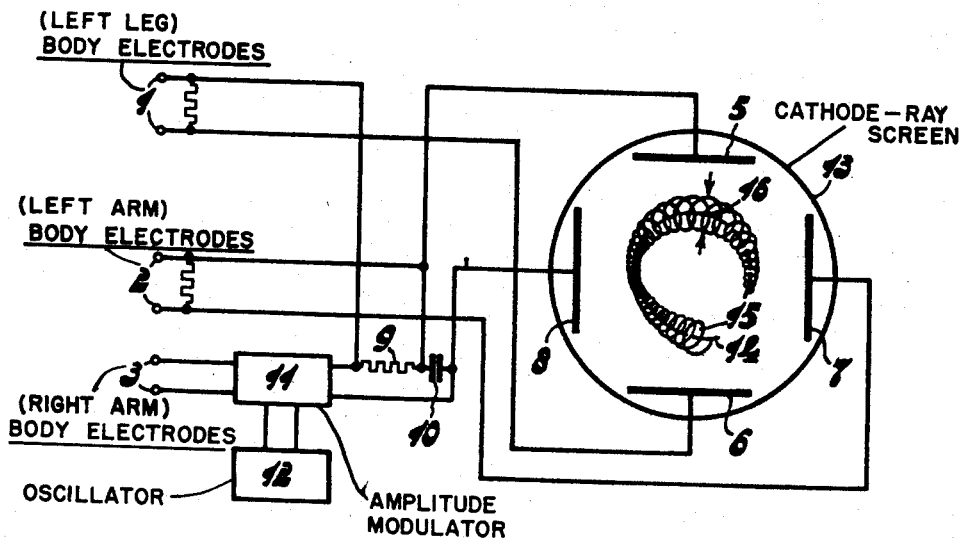
CARDIOGRAPHIC OSCILLOGRAPH
INVENTOR
Augustus Gerard Theodoor Becking
By
AGENT Patented Apr. 20, 1954

2,676,283

UNITED STATES PATENT OFFICE 2,676,283

OSCILLOGRAPHIC DEVICE

Augustus Gerard Theodoor Becking, Eindhoven, Netherlands, assignor to Hartford National Bank and Trust Company, Hartford, Conn., as trustee Application August 7, 1951, Serial No. 240,711

Claims priority, application Netherlands August 25, 1950

4 Claims. (Cl. 315—24)

The invention relates to oscillographic devices for the optical reproduction in one image plane of the variations of electric measuring voltages with time.

In known devices of this kind two measuring voltages are respectively supplied to two deflection members. These deflection members being at an angle $\theta$ with one another, position the spot of the same image point on the image surface in either of two different directions in that plane in accordance with the voltages supplied. This applies to devices comprising a cathode-ray tube and also to devices comprising two bifilar oscillographs, in which the axes of rotation of the movable systems are at an angle $\theta$ with each other.

The invention more particularly relates to oscillographic devices of the kind described above, in which provisions are made to render a third measuring voltage visible simultaneously with the two other voltages. Various solutions of this problem have been suggested. There has, for example, been proposed a method in which by a suitable combination of the three measuring voltages two images are recorded side by side on the image surface; viewed stereoscopically these two images together produce a special image having three dimensions corresponding to the three measuring voltages. Consequently, the third measuring voltage is represented by the depth produced by the stereoscopic effect of the two-dimensional figure drawn by the two first-mentioned measuring voltages.

Particularly in the case of a periodic phenomena or of periodic phenomena having long cycles it is, however, difficult to distinguish the stereoscopic image and it is still more difficult to carry out quantitative measurements of the third measuring voltage. A further method of reproducing the third measuring voltage is known in which the brightness of the two-dimensional figure drawn by the two first measuring voltages is varied with the third measuring voltage. This method has a limitation in that with a view to the making of photographic records the brightness is preferably kept constant, and that sometimes the variation of the brightness is to be utilized for other purposes, so that it is no longer available for the reproduction of the third measuring voltage. This applies to the transient periodical reduction of the brightness to a very low value in order to determine the velocity of the variations of the two first measuring voltages (so-called time division) and to brightness variations produced to determine the direction in which the image point moves along the two-dimensional curve under the action of the two first measuring voltages.

The object of the invention is to obviate or at least to mitigate the said limitations.

It is based on a device as described above, in which a first and a second measuring voltage are supplied to the first and the second deflection member respectively. The device according to the invention has the feature that to the first deflection member is, in addition, supplied a first auxiliary alternating voltage and to the second deflection member a second auxiliary alternating voltage having the same amplitude and frequency, but a phase shift $\theta$ relative to the first auxiliary alternating voltage and that a third measuring voltage is supplied to an amplitude modulator which modulates the two auxiliary alternating voltages in accordance with the third measuring voltage, the amplitude of the auxiliary alternating voltages being small relative to the difference between the maximum and minimum value of at least one of the two first-mentioned measuring voltages and the cycle of the auxiliary alternating voltages being small relative to the time interval between successive maximum and minimum values of each of the measuring voltages. If an alternating voltage is supplied to the first deflection member and none to the other deflection member, the image point will describe a straight line on the image surface. If then a similar alternating voltage is supplied to the second deflection member and none to the first deflection member, the image point will describe a different line on the image surface. The angle $\theta$ referred to above, is to be understood to mean here the acute angle between these lines. In effect, the deflection members establish a two dimensional coordinate system in which the two axes are always at an angle $\theta$ relative to each other. On the two lines is now assumed a positive direction in a manner such that from the point of intersection the positive directions are at an angle of $180° - \theta$ with one another. The voltage supplied to a deflection member is assumed to be positive, if under the action of this voltage the image point moves in a positive sense along the line associated with the deflection member. The aforesaid phase-shift $\theta$ is to be considered as follows: The phase-shift of the auxiliary alternating voltages is assumed to be nil, when they are positive at the same time. From this condition the phase of one of the alternating voltages is to be shifted through an angle $\theta$ in order to produce the aforesaid phase shift $\theta$.

It will appear that in the device according to the invention the variation of the third measuring voltage with time can be inferred from the width of the image lines drawn by the image point under the action of the two first measuring voltages.

In order that the invention may be more clearly understood and readily carried into effect, it will now be described more fully with reference to the accompanying drawing illustrating schematically a preferred embodiment of the invention.

For the optical reproduction use is made here of a cathode-ray tube 13, of which the deflection plates 5, 6 and 7, 8 serve as deflection members. The first, second and third measuring voltages, which are if necessary, electronically amplified, are supplied to the pairs of terminals 1, 2 and 3, respectively. The first measuring voltage is supplied through the resistor 9 to the plates 5 and 6 for deflection in a vertical direction. The second measuring voltage is supplied through a capacitor 10 to the plates 7 and 8 for deflection of the electron ray in a horizontal direction. Under the action of the first and the second measuring voltage the electron ray and, hence, the image point visible on the screen of the tube 13 will describe a curve varying with the variation of these two measuring voltages with time. This curve is shown in the figure by the broken line 14. In the oscillator 12 is produced an alternating voltage, the frequency of which is equal to that of the auxiliary alternating voltages. This voltage is modulated in the amplitude modulator 11 in accordance with the third measuring voltage. The output circuit of the modulator 11 comprises the series combination of the resistor 9 and the capacitor 10. These parts are proportioned to be such that their voltages, which have a phase-shift of 90° relative to one another, have equal amplitudes. These voltages are supplied in the manner shown in series with the first and the second measuring voltage to the deflection members of the cathode-ray tube 13. Since for normal cathode-ray tubes the aforesaid angle $\theta$ is equal to 90°, the two auxiliary alternating voltages must have a phase difference of 90°, which is ensured, as has been observed, by the series combination 9, 10. In general, the phase-shift $\theta$ will be realizable by a suitable choice of networks or with the aid of a phase-shifting device. It is easily understandable that it is thus ensured that, in the absence of the first and the second measuring voltage, the image point will describe a circle, the radius of which varies with the third measuring voltage, for which, consequently, it is a measure. Owing to the simultaneous presence of the first and the second measuring voltage the center of this circle will move along the curve 14, so that the image point will describe a compound curve 15. By the shape of this compound curve the area of the centers of the circles may be readily determined. This is the curve 14, which indicates the variation of the first and the second measuring voltages with time. The third measuring voltage influences, as has been observed, the width 16 of the compound curve. Consequently the variation of the third measuring voltage may be inferred from the width 16.

It will be obvious that the radii of the circles have to be small relative to the dimensions of the curve 14 for the sake of clarity. This is ensured by choosing the amplitude of the auxiliary alternating voltages to be small relative to the difference between the maximum and the minimum values of at least one of the two first-mentioned measuring voltages. Clarity, furthermore, required that the compound curve 15 should have a sufficiently large number of loops, since otherwise the width 16 cannot be determined with adequate accuracy. This is ensured by choosing the period of the auxiliary alternating voltages to be small relative to the time interval between successive maximum and minimum values of each of the measuring voltages.

It has been found to be advantageous to choose the number of loops of the curve to be so high that the loops can no longer be distinguished separately. This is achieved by choosing the frequencies of the auxiliary alternating voltages to be so high that the variations of the measuring voltages during one period of the auxiliary alternating voltages are small relative to the mean amplitude of the auxiliary alternating voltage.

The device according to the invention may be used with advantage for cardiography, since it is possible to observe three relatively independent projections of the heart vector by supplying voltages proportional to these projections to the device according to the invention as measuring voltages. The manner in which the three voltages are derived from the heart action of the human body is well-known in the field of electrocardiography and in this connection reference is made to the Patent 2,098,695.

It should be noted that the image of the three measuring voltages obtained by the device according to the invention gives the impression of being spacial without the need for further means. Those parts of the compound curve 15 in which the width 16 is great seem, on visual observation, to be shifted forwards, in the direction of the observer relatively to the other parts.

What I claim is:

1. An oscillograph comprising a cathode-ray tube having a fluorescent screen and first and second deflection means for effecting beam deflection in first and second coordinates having a predetermined angular displacement, means to apply first and second recurrent voltages to said first and second deflection means respectively to generate a trace on said screen, an auxiliary alternating voltage source, means to amplitude modulate said auxiliary voltage in accordance with a third recurrent voltage, means to derive from said amplitude modulated auxiliary voltage first and second auxiliary components of like amplitude displaced in phase relative to each other to an extent corresponding to said predetermined displacement, the amplitude of said auxiliary components being small relative to one of said first and second recurrent voltages, and means to supply said first and second components to said first and second deflection means respectively to vary the thickness of the trace whereby the oscillograph is simultaneously responsive to said first, second and third recurrent voltages.

2. An oscillograph as set forth in claim 1 wherein the frequency and mean amplitude of the auxiliary components have values at which variations in the first, second and third recurrence voltages occurring during one cycle of the auxiliary components are small relative to said mean amplitude.

3. An oscillograph as set forth in claim 1 wherein said predetermined angular displacement is substantially 90°.

4. A cardiographic oscillograph comprising first, second and third electrodes for deriving first, second and third recurrent voltages respectively from a living body, a cathode-ray tube having a fluorescent screen and first and second deflection means for effecting beam deflection in first and second coordinates having an angular displacement, means to apply said first and second recurrent voltages to said first and second deflection means respectively to generate a trace on said screen, an auxiliary alternating voltage source, means to amplitude modulate said auxiliary voltage in accordance with said third recurrent voltage, means to derive from said amplitude modulated auxiliary voltage first and second auxiliary components of like amplitude displaced in phase relative to each other to an extent corresponding to said predetermined displacement, the amplitude of said auxiliary components being small relative to one of said first and second recurrent voltages, and means to supply said first and second components to said first and second deflection means respectively to vary the thickness of the two dimensional trace whereby the oscillograph is simultaneously responsive to said first, second and third recurrent voltages.

References Cited in the file of this patent

UNITED STATES PATENTS

| Number | Name | Date |
|---|---|---|
| 2,098,695 | Southwick | Nov. 9, 1937 |
| 2,151,917 | Hyland | Mar. 28, 1939 |
| 2,450,005 | Labin et al. | Sept. 28, 1948 |
| 2,474,177 | Wild | June 21, 1949 |